United States Patent
Li et al.

(10) Patent No.: US 11,643,354 B2
(45) Date of Patent: May 9, 2023

(54) MICROSTRUCTURED GLASS ARTICLES WITH AT LEAST 100 CORE ELEMENTS AND METHODS FOR FORMING THE SAME

(71) Applicant: Corning Incorporated, Corning, NY (US)

(72) Inventors: Ming-Jun Li, Horseheads, NY (US); Jeffery Scott Stone, Addison, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/849,005

(22) Filed: Jun. 24, 2022

(65) Prior Publication Data

US 2022/0340473 A1    Oct. 27, 2022

Related U.S. Application Data

(62) Division of application No. 15/734,083, filed as application No. PCT/US2019/034939 on May 31, 2019, now Pat. No. 11,401,196.

(Continued)

(51) Int. Cl.
*C03B 37/012* (2006.01)
*C03B 37/014* (2006.01)
(Continued)

(52) U.S. Cl.
CPC .. *C03B 37/01214* (2013.01); *C03B 37/01282* (2013.01); *C03B 37/01446* (2013.01);
(Continued)

(58) Field of Classification Search
CPC ........ C03B 37/01214; C03B 37/01282; C03B 37/01446; C03B 37/01453; C03B 37/027;
(Continued)

(56) References Cited

U.S. PATENT DOCUMENTS 4,397,524 A    8/1983   Koshimura et al.
4,775,401 A    10/1988  Fleming et al.
(Continued)

FOREIGN PATENT DOCUMENTS

EP    0915064 A1    5/1999
EP    2320256 A1    5/2011

OTHER PUBLICATIONS

International Search Report and Written Opinion of the International Searching Authority; PCT/US2019/034939; dated Nov. 4, 2019; 14 Pages; European Patent Office.

*Primary Examiner* — Ellen E Kim

(57) ABSTRACT

According to embodiments, a method of making a microstructured glass article includes bundling M bare optical fibers in a fiber bundle, wherein M is an integer greater than 100. Thereafter, the fiber bundle may be inserted in a cavity of a soot preform. The soot preform may have a density of less than or equal to 1.5 g/cm³ and comprise silica-based glass soot. The soot preform and inserted fiber bundle may then be consolidated to form a microstructured glass article preform. The microstructured glass article preform may then be drawn into the microstructured glass article comprising M core elements embedded in a cladding matrix.

19 Claims, 13 Drawing Sheets

Related U.S. Application Data

(60) Provisional application No. 62/679,196, filed on Jun. 1, 2018.

(51) Int. Cl.
    *C03B 37/027*     (2006.01)
    *G02B 6/02*     (2006.01)
    *G02B 6/028*     (2006.01)
    *G02B 6/032*     (2006.01)

(52) U.S. Cl.
    CPC ...... *C03B 37/01453* (2013.01); *C03B 37/027* (2013.01); *G02B 6/02042* (2013.01); *G02B 6/0281* (2013.01); *G02B 6/02395* (2013.01); *G02B 6/032* (2013.01); *C03B 2201/12* (2013.01)

(58) Field of Classification Search
    CPC ............ C03B 2201/12; C03B 2201/20; C03B 2201/42; G02B 6/02042; G02B 6/02395; G02B 6/0281; G02B 6/032
    See application file for complete search history.

(56) References Cited

U.S. PATENT DOCUMENTS

| | | | |
|---|---|---|---|
| 5,510,063 | A | 4/1996 | Gadkaree et al. |
| 6,066,020 | A | 5/2000 | Devoe et al. |
| 7,930,904 | B2 | 4/2011 | Bookbinder et al. |
| 9,151,887 | B2 | 10/2015 | Hoover et al. |
| 10,983,269 | B1 | 4/2021 | D'Urso et al. |
| 2007/0104437 | A1* | 5/2007 | Bookbinder ...... C03B 37/01446 65/412 |
| 2016/0341891 | A1 | 11/2016 | Sulejmani et al. |
| 2017/0123146 | A1 | 5/2017 | Chen et al. |
| 2017/0146715 | A1 | 5/2017 | Bennett et al. |
| 2017/0351023 | A1 | 12/2017 | Alkeskjold et al. |
| 2018/0079677 | A1* | 3/2018 | Bookbinder .......... C03B 37/018 |

* cited by examiner

MICROSTRUCTURED GLASS ARTICLES WITH AT LEAST 100 CORE ELEMENTS AND METHODS FOR FORMING THE SAME

CROSS-REFERENCE TO RELATED APPLICATIONS

This application is a divisional of and claims priority under 35 U.S.C. § 120 to U.S. patent application Ser. No. 15/734,083 filed on Dec. 1, 2020, which was the national stage application under 35 U.S.C. § 371 of International Application No. PCT/US2019/034939, filed on May 31, 2019, which claims the benefit of priority to 35 U.S.C. § 119 of U.S. Provisional Application Ser. No. 62/679,196 filed on Jun. 1, 2018, the contents of which are relied upon and incorporated herein by reference in their entirety.

BACKGROUND

The present specification generally relates to glass articles and, more specifically, to microstructured glass articles and methods for forming the same.

SUMMARY

According to one aspect, a method of making a microstructured glass article includes bundling M bare optical fibers in a fiber bundle, wherein M is an integer greater than 100. Thereafter, the fiber bundle may be inserted in a cavity of a soot preform. The soot preform may have a density of less than or equal to 1.5 g/cm$^3$ and comprise silica-based glass soot. The soot preform and inserted fiber bundle may then be consolidated to form a microstructured glass article preform. The microstructured glass article preform may then be drawn into the microstructured glass article comprising M core elements embedded in a cladding matrix.

According to another aspect of the method which is combinable with any other aspect or embodiment of the method or microstructured glass article thereof, the soot preform and inserted fiber bundle may be consolidated at a temperature from about 1225° C. to about 1535° C.

According to another aspect of the method which is combinable with any other aspect or embodiment of the method or microstructured glass article thereof, the method may further comprise drying the soot preform and inserted fiber bundle at a temperature from about 1000° C. to 1200° C. in flowing chlorine gas after inserting and prior to consolidating.

According to another aspect of the method which is combinable with any other aspect or embodiment of the method or microstructured glass article thereof, the method may further comprise doping the soot preform with fluorine during the consolidating.

According to another aspect of the method which is combinable with any other aspect or embodiment of the method or microstructured glass article thereof, the bare optical fibers may have diameters from about 50 µm to about 500 µm.

According to another aspect of the method which is combinable with any other aspect or embodiment of the method or microstructured glass article thereof, the bare optical fibers may comprise a glassy layer comprising less than or equal to 15 wt. % TiO$_2$.

According to another aspect of the method which is combinable with any other aspect or embodiment of the method or microstructured glass article thereof, the core elements may have a step index profile or a graded index profile.

According to another aspect of the method which is combinable with any other aspect or embodiment of the method or microstructured glass article thereof, the core elements may have a refractive index $n_C$, the cladding matrix may have a refractive index $n_{C1}$, and $n_C > n_{C1}$.

According to another aspect of the method which is combinable with any other aspect or embodiment of the method or microstructured glass article thereof, each core element, may have a low-index annulus surrounding the core element, the low-index annulus having an index of refraction $n_L$ such that $n_L < n_{C1} < n_C$.

According to another aspect of the method which is combinable with any other aspect or embodiment of the method or microstructured glass article thereof, the core elements may have a refractive index $n_C$, the cladding matrix has a refractive index $n_{C1}$, and $n_C < n_{C1}$.

In another aspect, a microstructured glass article formed according to the aforementioned method may include a cladding matrix and M core elements disposed within the cladding matrix. M may be an integer greater than or equal to 100, such as greater than or equal to 500. The core elements may have a radius less than 5 µm, such as less than or equal to 3 µm.

According to another aspect of the microstructured glass article which is combinable with any other aspect or embodiment of the microstructured glass article or the methods for making the same, the core elements may have radii less than or equal to 3 µm.

According to another aspect of the microstructured glass article which is combinable with any other aspect or embodiment of the microstructured glass article or the methods for making the same, the cladding matrix may have an index of refraction $n_{C1}$ and the core elements may have an index of refraction $n_C$ such that $n_{C1} < n_C$ wherein a relative refractive index percent (Δ%) of the core elements relative to the cladding matrix is greater than about 0.3%.

According to another aspect of the microstructured glass article which is combinable with any other aspect or embodiment of the microstructured glass article or the methods for making the same, the microstructured glass article may further include a glassy layer comprising less than or equal to 15 wt. % TiO$_2$ disposed between the core elements and the cladding matrix.

According to another aspect of the microstructured glass article which is combinable with any other aspect or embodiment of the microstructured glass article or the methods for making the same, the core elements may have a step index profile or a graded index profile.

According to another aspect of the microstructured glass article which is combinable with any other aspect or embodiment of the microstructured glass article or the methods for making the same, the core elements may have a refractive index $n_C$, the cladding matrix may have a refractive index $n_{C1}$, and $n_C < n_{C1}$.

According to another aspect of the microstructured glass article which is combinable with any other aspect or embodiment of the microstructured glass article or the methods for making the same, each core element may have a low-index annulus surrounding the core element, the low-index annulus having an index of refraction $n_L$ such that $n_L < n_{C1} < n_C$.

According to another aspect of the microstructured glass article which is combinable with any other aspect or embodiment of the microstructured glass article or the methods for making the same, the core elements may have a refractive index $n_C$, the cladding matrix has a refractive index $n_{C1}$, and $n_C<n_{C1}$.

According to another aspect of the microstructured glass article which is combinable with any other aspect or embodiment of the microstructured glass article or the methods for making the same, the core elements may be hollow.

According to another aspect of the microstructured glass article which is combinable with any other aspect or embodiment of the microstructured glass article or the methods for making the same, the core elements may include hollow core elements and solid core elements.

Additional features and advantages of the microstructured glass articles described herein and methods for making the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
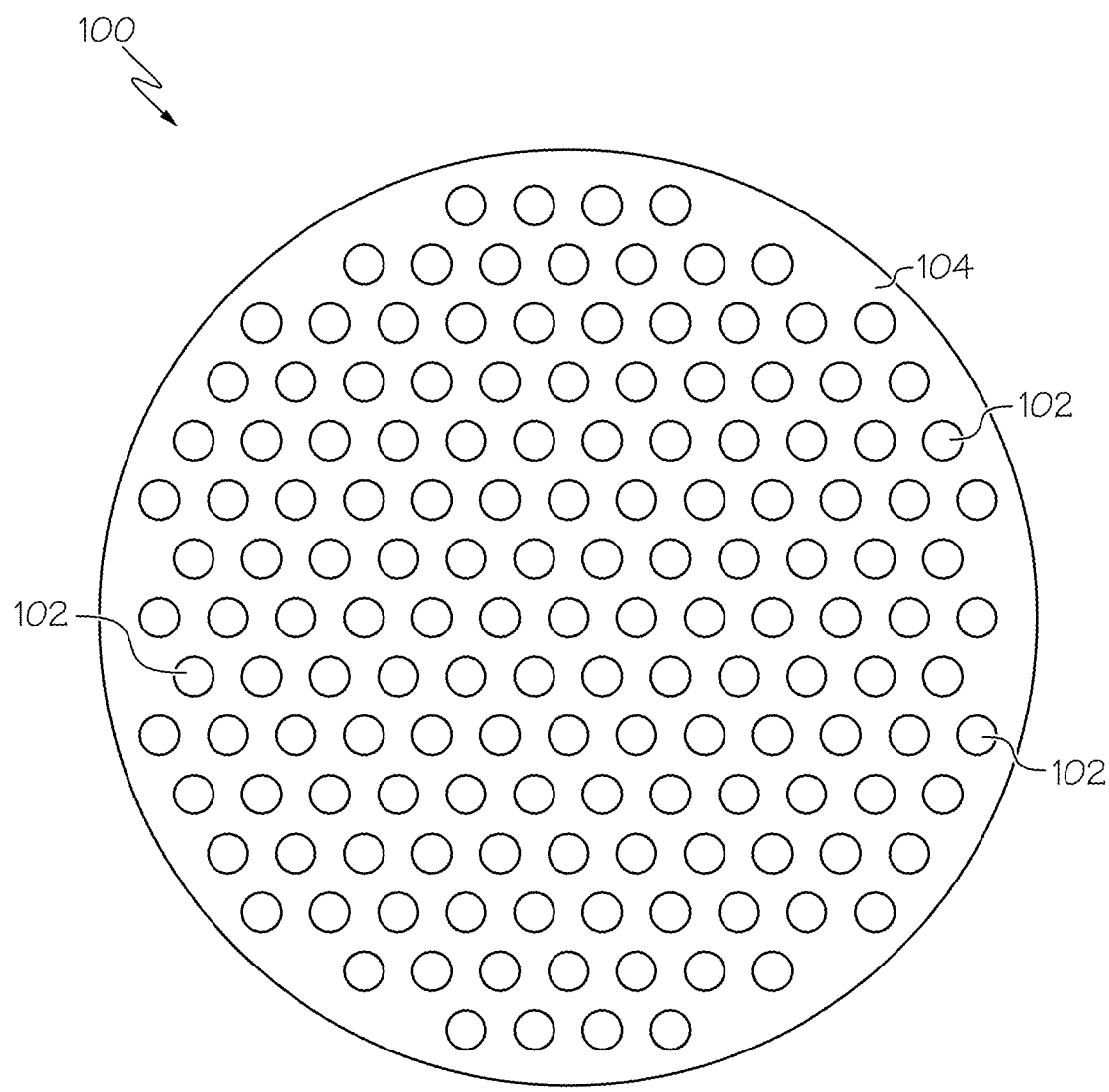
FIG. 1 schematically depicts a cross section of a microstructured glass article according to one or more embodiments shown and described herein.

Reference will now be made in detail to embodiments of the microstructured glass articles and methods for making the same, examples of which are illustrated in the accompanying drawings. Whenever possible, the same reference numerals will be used throughout the drawings to refer to the same or like parts. One embodiment of a microstructured glass article is schematically depicted in cross section in FIG. 1. In embodiments, a method of forming a microstructured glass article generally includes bundling M bare optical fibers in a fiber bundle, wherein M is an integer greater than 100. Thereafter, the fiber bundle may be inserted in a cavity of a soot preform. The soot preform may have a density of less than or equal to 1.5 g/cm$^3$ and comprise silica-based glass soot. The soot preform and inserted fiber bundle may then be consolidated to form a microstructured glass article preform. The microstructured glass article preform may then be drawn into the microstructured glass article comprising M core elements embedded in a cladding matrix. Various embodiments of microstructured glass articles and methods for making the same will be described herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

The phrase "bare optical fiber" refers to optical fiber which is devoid of any organic coatings applied to the glass portion of the optical fiber.

The phrase "refractive index profile," as used herein, refers to the relationship between refractive index or relative refractive index and the dimensions of the optical fiber.

The phrase "relative refractive index," as used herein, is defined as $\Delta(r)\% = 100 \times (n(r)^2 - n_{REF}^2)/2n_i^2$, where $n_i$ is an extrema of the refractive index in region i (i.e., the minimum or maximum of the refractive index in region i), unless otherwise specified. The relative refractive index percent is measured at 1550 nm unless otherwise specified. The term $n_{REF}$ is the average refractive index of the cladding matrix, which can be calculated, for example, by taking "N" index measurements $(n_{c1}, n_{c2}, \ldots n_{cN})$ of the cladding matrix (which, in some embodiments, may be undoped silica), and calculating the average refractive index by:

$$n_C = (1/N) \sum_{i=1}^{i=N} n_{Ci}$$

As used herein, the relative refractive index is represented by A and its values are given in units of "%," unless otherwise specified. In cases where the refractive index of a region is less than the reference index $n_{REF}$, the relative refractive index is negative and is referred to as having a depressed region or depressed-index, and the minimum relative refractive index is calculated at the point at which the relative refractive index is most negative, unless otherwise specified. In cases where the refractive index of a region is greater than the reference index $n_{REF}$, the relative index percent is positive and the region can be said to be raised or to have a positive index.

The term "α-profile" or "alpha profile" refers to a relative refractive index profile of the core elements, expressed in terms of $\Delta(r)$ which is in units of "%", where r is the radius of the core element and which follows the equation:

$$\Delta(r)\% = \Delta(r_o)(1 - [|r - r_o|/(r_1 - r_o)]^\alpha),$$

where $r_o$ is the point at which $\Delta(r)$ is maximum, $r_1$ is the point at which $\Delta(r)\%$ is zero with respect to the common outer cladding, and r is in the range $r_i \leq r \leq r_f$, where Δ is defined as above, $r_i$ is the initial point of the α-profile, $r_f$ is the final point of the α-profile, and α is an exponent which is a real number. For a profile segment beginning at the centerline of a core element (i.e., r=0), the α-profile has the simpler form $$\Delta(r)\% = \Delta(0)(1 - [|r|/(r_1)]^\alpha),$$

where $\Delta(0)$ is the refractive index delta at the centerline of the core element.

Microstructured glass articles can have unique optical properties, such as refractive index, dispersion, scattering, and nonlinear effects, that conventional materials do not have. Microstructured glass articles may be used for a variety of applications including, but not limited to, optical fiber, imaging components, display components, and other optical components. For these applications, it may be desirable to have a large number (e.g., a hundred to several thousand) closely-spaced microstructure elements (e.g., core elements) having a different refractive index than that of the matrix or background material (i.e., the cladding matrix). However, making such microstructured glass articles can be challenging. The embodiments described herein relate to techniques for making microstructured glass articles with a large number of core elements and microstructured glass articles made thereby.

Referring now to FIG. 1, a cross section of one embodiment of a microstructured glass article 100 is schematically depicted. The microstructured glass article 100 may be, for example, an optical fiber, a glass cane, or a glass preform which may be drawn into optical fiber or a glass cane. The microstructured glass article 100 generally comprises M core elements 102 embedded in a cladding matrix 104. In the embodiments described herein, M is an integer greater than or equal 100, such as greater than or equal to 500, greater than or equal to 1000, greater than or equal to 1500, or even greater than or equal to 2000. It is noted that, for ease of illustration, the number of core elements 102 in the microstructured glass articles 100 depicted in the figures is less than 100. However, in practice, the number of core elements 102 in the microstructured glass article 100 is at least 100. The core elements 102 are oriented in the cladding matrix 104 such that the long axis of each core element 102 is generally parallel with the long axes of adjacent core elements.

In the embodiments described herein, the cladding matrix 104 is formed from silica-based glass ($SiO_2$) with an index of refraction $n_{C1}$. In embodiments, the index of refraction $n_{C1}$ of the cladding matrix 104 is generally less than the index of refraction $n_C$ of the core elements 102 (i.e., $n_{C1} < n_C$). In some embodiments the cladding matrix 104 is substantially free from dopants or contaminants which would alter the index of refraction of the cladding matrix 104 including, without limitation, up-dopants (i.e., germanium and the like) and down-dopants (i.e., boron, fluorine and the like). The term "substantially free," as used herein, means that the cladding matrix 104 does not contain any constituent components intentionally added to the glass of the cladding matrix 104 but may contain impurities or "tramp" contaminants in an amount less than or equal to about 0.1 wt. %. In other embodiments, the cladding matrix 104 may comprise one or more up-dopants which increases the refractive index of the silica glass, or one or more down-dopants which decreases the refractive index of the silica glass.

In the embodiment of the microstructured glass article 100 depicted in FIG. 1, the core elements 102 are generally formed from silica-based glass and have an index of refraction $n_C$ and a relative refractive index $\Delta_C$ relative to the cladding matrix 104. In general, the index of refraction $n_C$ of the core elements 102 is greater than the index of refraction $n_{C1}$ of the cladding matrix 104. Accordingly, in some embodiments, the core elements may be formed from silica-based glass without any additional dopants intentionally added. In embodiments, the cladding matrix 104 is down-doped relative to the core elements 102. In other embodiments, the silica-based glass of the core elements 102 is doped with one or more dopants which increase the index of refraction of the core elements 102. For example, the core elements 102 may comprise silica-based glass doped with germanium such as when the core elements 102 comprise silica ($SiO_2$) glass up-doped with germania (GeO$_2$). However, it should be understood that dopants other than germania may be utilized in the core elements, including, without limitation, TiO$_2$, Al$_2$O$_3$, ZrO$_2$, P$_2$O$_5$, Nb$_2$O$_5$, Ta$_2$O$_5$ or the like. Such dopants may be incorporated in the core elements 102 either individually or in combination in order to obtain the desired index of refraction $n_C$ and relative refractive index $\Delta_C$. In some embodiments, the core elements 102 may comprise from about 3.2 wt. % to about 40 wt. % GeO$_2$. For example, in some embodiments, the core elements 102 comprise from about 5.0 wt. % to about 16 wt. % GeO$_2$, from about 5.5 wt. % to about 10.0 wt. % GeO$_2$, or even from about 5.5 wt. % to about 8.0 wt. % GeO$_2$, which increases the index of refraction $n_C$ of the core elements 102 relative to undoped silica glass.

In the embodiments described herein, the relative refractive index $\Delta_C$ of the core elements 102 relative to the cladding matrix 104 is greater than or equal to 0.3%. For example, in some embodiments, the relative refractive index $\Delta_C$ of the core elements 102 relative to the cladding matrix 104 is greater than or equal to about 0.5% or even greater than or equal to about 0.75% relative to the cladding matrix 104. In some embodiments, the relative refractive index $\Delta_C$ of the core elements 102 relative to the cladding matrix 104 is greater than or equal to about 1.0% or even greater than or equal to about 1.5% relative to the cladding matrix 104. In still other embodiments, the relative refractive index $\Delta_C$ of the core elements 102 relative to the cladding matrix 104 is greater than or equal to about 2.0% relative to the cladding matrix 104. In these embodiments, the relative refractive index $\Delta_C$ of the core elements 102 relative to the cladding matrix 104 is less than or equal to about 3.0% relative to the cladding matrix 104.

In the embodiments described herein, the core elements 102 generally have radii r that are less than or equal to 5 μm or even less than or equal to 3 μm. In some embodiments, the core elements 102 generally have radii r that are less than or equal to 2 μm or even less than or equal to 1 μm. In some of these embodiments, the core elements 102 generally have radii r that are greater than or equal to 100 nm and less than or equal to 500 nm.

While FIG. 1 schematically depicts the microstructured glass article 100 having core elements 102 that are approximately the same size, it should be understood that, in other embodiments, the core elements 102 may have a distribution of different radii within the range(s) of radii specified herein.

Figure 2A:
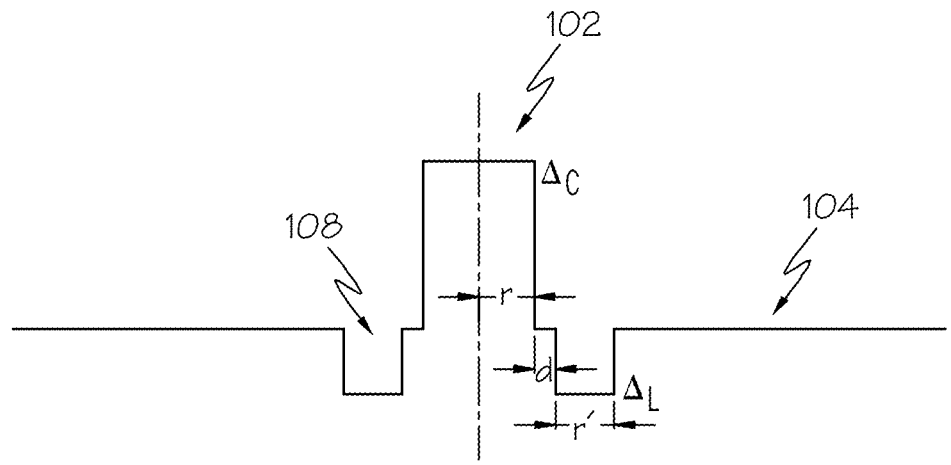
FIG. 2A graphically depicts a step-index relative refractive index profile of a core element of a microstructured glass article according to one or more embodiments shown and described herein.
Figure 2B:
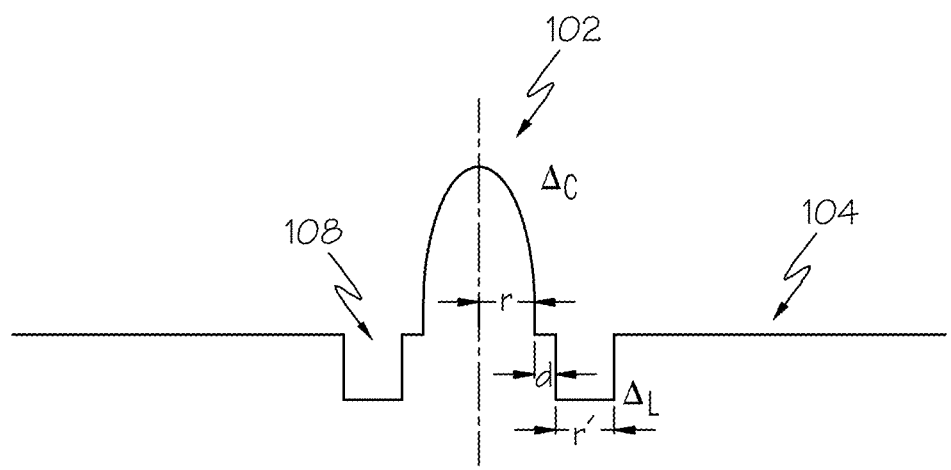
FIG. 2B graphically depicts an alpha-profile relative refractive index profile of a core element of a microstructured glass article according to one or more embodiments shown and described herein.

Referring now to FIGS. 2A and 2B, in some embodiments, the core elements 102 may have a step-index profile as depicted in the refractive index profile of FIG. 2A. In other embodiments, the core elements 102 may have a graded index profile, such as an α-profile, as depicted in the refractive index profile of FIG. 2B. In these embodiments an α-value defines the index of refraction of the core element as a function of the radius of the element. In embodiments where the core elements have α-profiles, the α-value of the α-profile may be in a range from about 1.9 to about 2.2 as measured at 1500 nm.

In some embodiments described herein, all of the M core elements 102 may have step refractive index profiles as depicted in FIG. 2A. In some other embodiments, all of the M core elements 102 may have graded refractive index profiles as depicted in FIG. 2B. In still other embodiments, a portion of the M core elements 102 may have step refractive index profiles and the remainder of the M core elements 102 may have graded refractive index profiles.

Referring now to FIGS. 1 and 2A and 2B, in some embodiments, the core elements 102 may optionally further comprise a low-index annulus 108 which surrounds the core element 102, as graphically depicted in FIGS. 2A and 2B. The low-index annulus 108 generally has an index of refraction $n_L$ and a radial width r' greater than or equal to about 0.2 μm and less than or equal to about 2 μm or even greater than or equal to about 0.5 μm and less than or equal to about 1 μm. The index of refraction $n_L$ of the low-index annulus 108 is such that $n_L < n_{C_1} < n_C$ which yields refractive index profiles as depicted in FIGS. 2A and 2B.

In some embodiments, the low-index annulus 108 may comprise silica glass down-doped with fluorine. For example, the low-index annulus 108 may comprise from about 0.36 wt. % to about 3.0 wt. % fluorine, from about 0.72 wt. % to about 2.5 wt. % fluorine, or even from about 1.4 wt. % to about 2.0 wt. % fluorine such that the relative refractive index percent $\Delta_L$ of the low-index annulus 108 relative to the cladding matrix 104 is less than the relative refractive index of the core elements 102 relative to the cladding matrix 104. For example, in some embodiments, the relative refractive index of the low-index annulus 108 relative to the cladding matrix 104 is less than or equal to about −0.2%. In some embodiments, the relative refractive index percent $\Delta_L$ of the low-index annulus 108 relative to the cladding matrix 104 may be greater than or equal to about −1.0%. For example, in some embodiments, the relative refractive index percent $\Delta_L$ of the low-index annulus 108 is greater than or equal to about −1.0% and less than or equal to about −0.2% relative to the cladding matrix 104. In some other embodiments, the relative refractive index percent $\Delta_L$ of the low-index annulus 108 is greater than or equal to about −0.5% and less than or equal to about −0.3% relative to the cladding matrix 104.

In some embodiments, the low-index annulus 108 may be positioned in direct contact with the corresponding core element 102. In other embodiments, the low-index annulus may be spaced apart from the corresponding core element 102 by an offset spacing d. The offset spacing d may generally be in the range from greater than 0 μm to less than or equal to about 1 μm. In embodiments, the offset spacing d may be in the range from greater than or equal to about 0 μm to less than or equal to about 0.5 μm. The low-index annuli 108 generally reduce the cross-talk between adjacent core elements and facilitate spacing adjacent core elements closer together than adjacent core elements which do not have low-index annuli without increasing the amount of cross-talk between the adjacent core elements. Accordingly, in some embodiments described herein, core elements with low-index annuli may be utilized to decrease the spacing between adjacent core members.

While FIG. 1 schematically depicts a microstructured glass article 100 having core elements 102 formed from solid glass, it should be understood that other configurations are contemplated and possible. For example, in an alternative embodiment, the core elements 102 are down-doped with a dopant material which decreases the refractive index of the silica-based glass of the core elements 102 relative to the silica-based glass of the cladding matrix 104. For example, the core elements 102 may be down-doped with fluorine (F) or boron (B). Alternatively, the core elements may be formed with airlines, air holes, or voids which effectively reduce the index of refraction of the silica-base glass of the core elements 102. In these embodiments, the index of refraction $n_C$ of the core elements 102 is less than the index of refraction $n_{C_1}$ of the cladding matrix 104 (i.e., $n_C < n_{C_1}$). In these embodiments, the relative refractive index $\Delta_C$ of the core elements 102 relative to the cladding matrix 104 may be negative.

Figure 3:
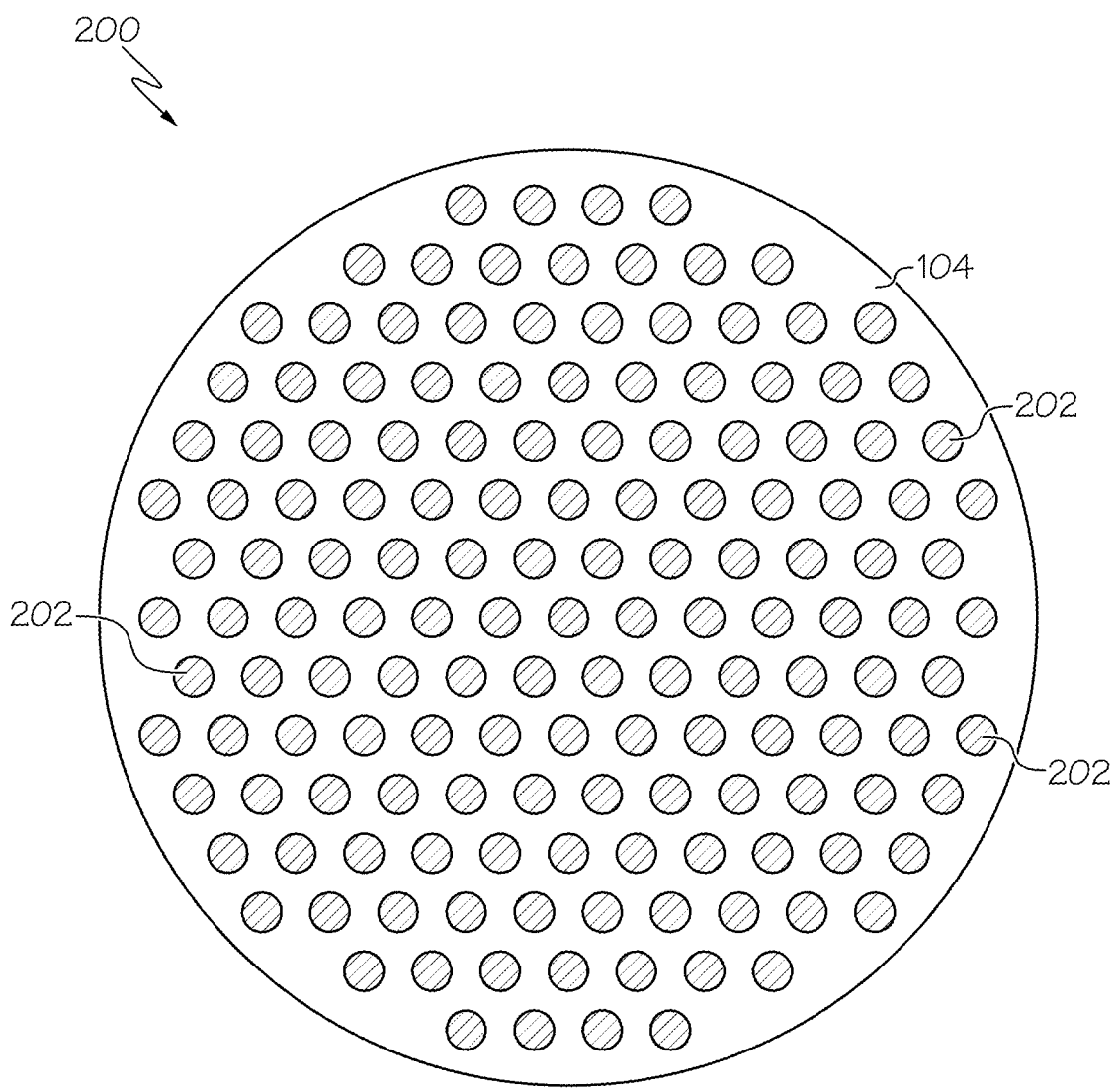
FIG. 3 schematically depicts a microstructured glass article comprising hollow core elements according to one or more embodiments shown and described herein.

Referring to FIG. 3 by way of example, FIG. 3 schematically depicts a microstructured glass article 200 having M core elements 202 arranged in a cladding matrix 104. In this embodiment, the core elements 202 are hollow tubes that form a plurality of channels extending through the cladding matrix 104. The hollow core elements 202 allow for a greater refractive index contrast between the core elements and the cladding matrix than is possible with conventional dopants. The core elements 202 may be formed from silica-based glass, as described herein with respect to FIG. 1, and the silica-based glass may be free from dopants or up-doped relative to the cladding matrix 104, also as described herein with respect to FIG. 1. However, in this embodiment, the core elements 202 are drawn from a tubular glass preform such that, after drawing, the core elements 202 are hollow. In these embodiments, the core elements 202 may have the same radii as described with respect to FIG. 1. Optionally, the core elements 202 may further include a low-index annulus, as described herein with respect to FIG. 1.

Referring now to FIGS. 1 and 3, in embodiments, the core elements 102, 202 may have the same index of refraction, the same shape (e.g., circular), and the same radii. In other embodiments, the core elements 102, 202 may have different indices of refraction, different shapes, and/or different radii. In still other embodiments, the microstructured glass article may comprise a combination of solid core elements 102 and hollow core elements 202. For example, the microstructured glass article may include solid core elements 102 and hollow core elements 202 arranged in an alternating pattern such that channels are disposed between the solid core elements 102.

Figure 4:
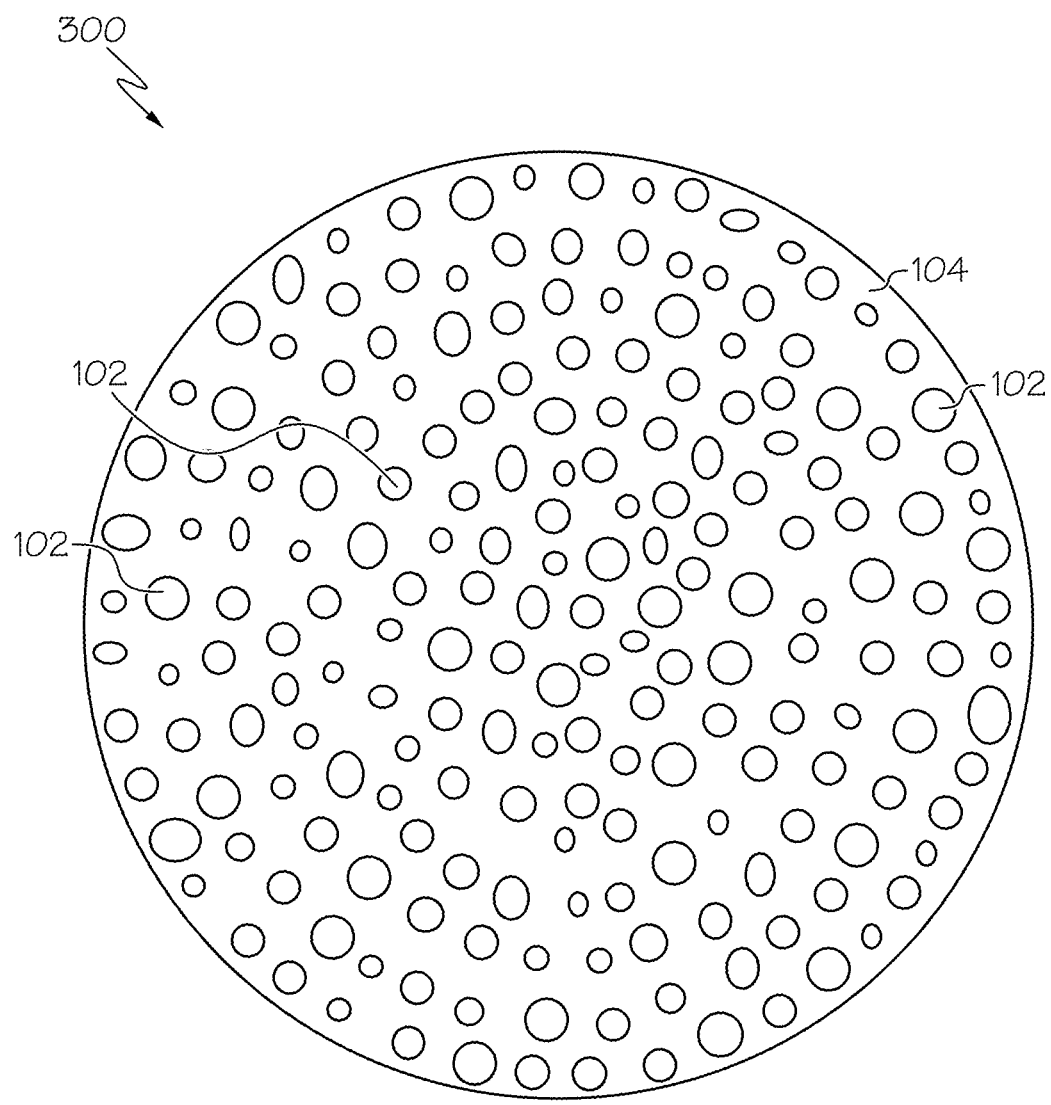
FIG. 4 schematically depicts a microstructured glass article comprising a random distribution of core elements.

Still referring to FIGS. 1 and 3, the core elements 102 may be arranged in the microstructured glass article in various configurations. For example, FIGS. 1 and 3 schematically depict embodiments of microstructured glass articles 100, 200 in which the core elements 102, 202 are arranged in the cladding matrix 104 in a triangular lattice. However, it should be understood that other configurations are contemplated and possible. For example, in embodiments, the core elements 102, 202 may be arranged in a square or rectangular lattice. In still other embodiments, the core elements 102, 202 may be randomly arranged in the cladding matrix. For example, FIG. 4 schematically depicts an embodiment of a microstructured glass article 300 in which the core elements 102 are randomly arranged in the cladding matrix 104 (i.e., the core elements 102 do not have a regular, repeating arrangement in the cladding matrix 104). Further, while FIG. 4 schematically depicts solid core elements 102 randomly arranged in the cladding matrix 104, it should be understood that the core elements may be, in the alternative, hollow core elements (as described herein with respect to FIG. 3) randomly arranged in the cladding matrix 104, or a combination of solid core elements and hollow core elements randomly arranged in the cladding matrix 104.

The microstructured glass articles 100, 200, 300 described herein may be formed in a variety of cross-sectional shapes. For example, FIGS. 1, 3, and 4 depict microstructured glass articles 100, 200, 300 which generally have circular cross sections. However, it should be understood that the microstructured glass articles 100, 200, 300 may be constructed with other cross sectional shapes including, without limitation, squares, ellipses, octagons and the like.

Methods of making the microstructured glass articles 100, 200, 300 will now be described with reference to FIGS. 5-12.

In one embodiment, the cladding matrix 104 (FIGS. 1, 3, and 4) of the microstructured glass article is formed from a soot preform. The term "soot", as used herein, refers to silica-based glass soot. In embodiments, the soot preform may be formed by depositing consecutive layers of silica-based glass soot on a bait rod using a vapor deposition process, such as the outside vapor deposition (OVD) process. While the OVD process is used to illustrate one method of forming a soot preform, it should be understood that the OVD process is one example and that other techniques and combinations of techniques for forming a soot preform may also be used. By way of example and not limitation, all or a portion of the soot preform may be formed using soot pressing techniques wherein silica-based glass soot (doped or un-doped) is compacted to a desired density in a mold around one or more inner layers which may likewise be formed by soot pressing. Alternatively, a combination of vapor deposition processes and soot pressing processes may be used to form the soot preform.

Figure 5:
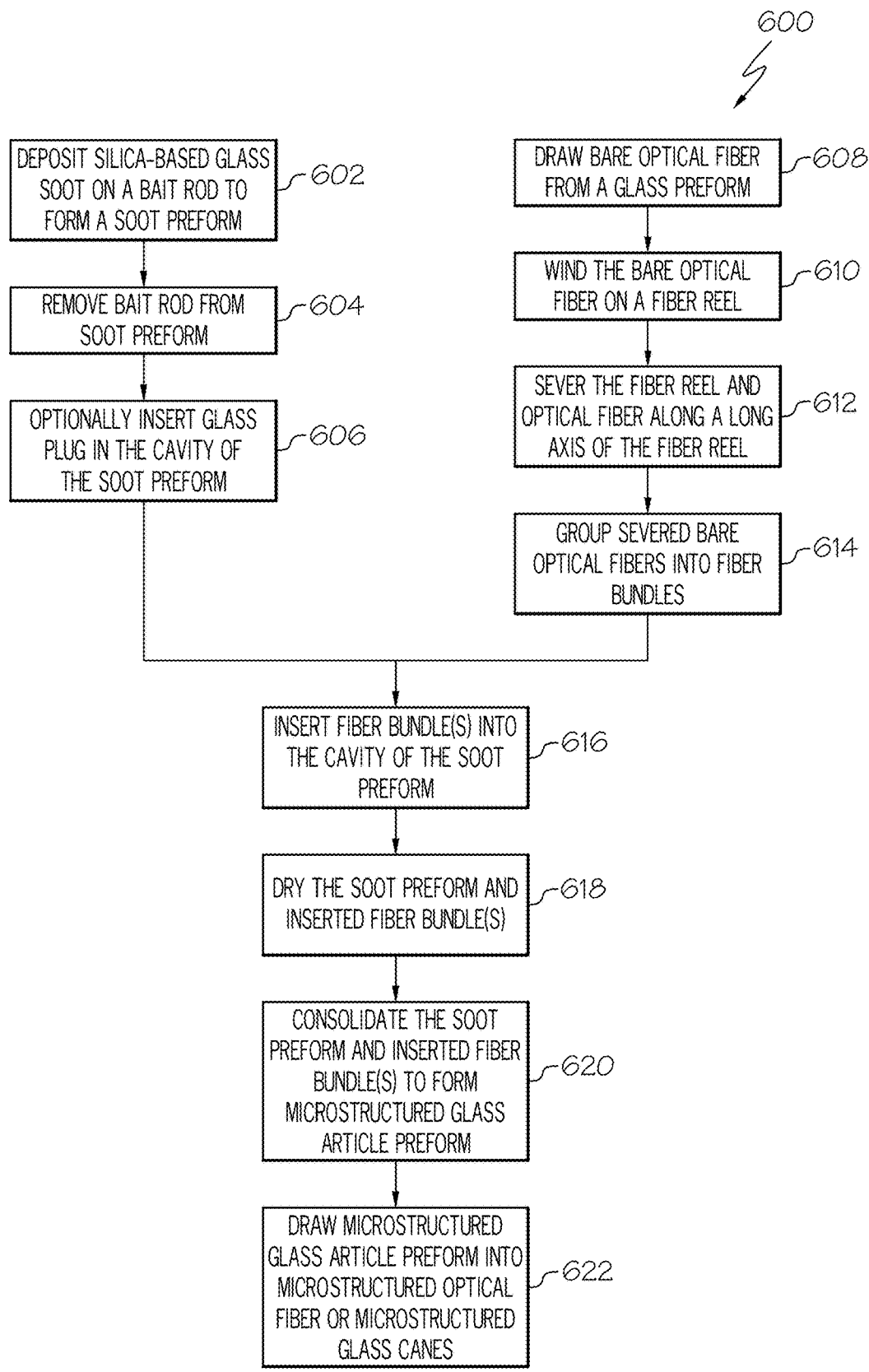
FIG. 5 is a flow chart of the steps for making a microstructured glass article according to one or more embodiments shown and described herein.
Figure 6:
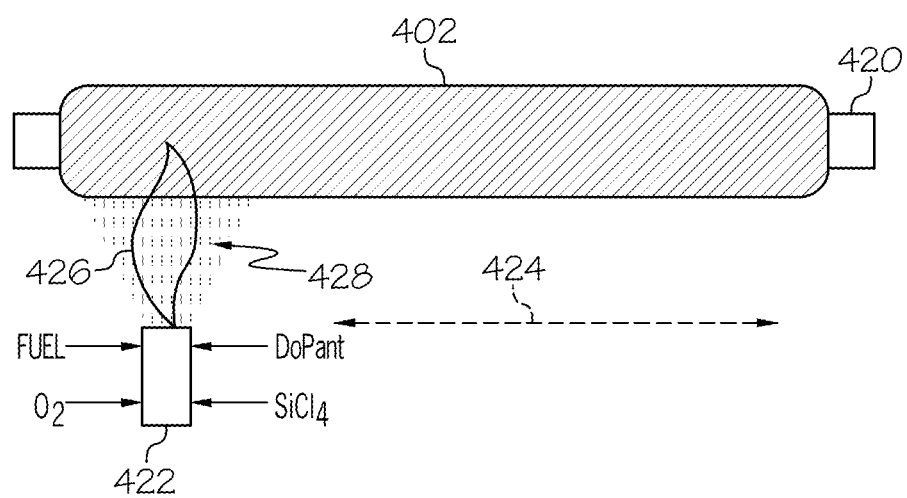
FIG. 6 schematically depicts a process for forming a soot preform, according to one or more embodiments shown and described herein.

Referring now to FIGS. 5 and 6, FIG. 5 is a flow chart of a method 600 for making a microstructured glass article and FIG. 6 schematically depicts one embodiment of an OVD process for making a soot preform. In step 602, the soot preform 402 may be formed by depositing silica-based glass soot on a bait rod 420. In embodiments, the bait rod 420 may be formed from a ceramic material. The silica-based glass soot is formed by providing a vapor-phase, silica-based glass precursor material, such as $SiCl_4$ or octamethylcyclotetrasiloxane (OMCTS), to a gas-fed burner 422. In embodiments where the soot preform comprises a dopant for altering the index of refraction of the cladding matrix, such as boron or the like, the dopant precursor materials may likewise be fed to the burner along with the silica-based glass precursor materials. The gas-fed burner 422 is supplied with fuel, such as $CH_4$, $D_2$ (deuterium), or CO, and oxygen which are combusted to create flame 426. The vapor phase silica-based glass precursor material may be delivered to the burner with the fuel to deposit soot having the desired density on the bait rod 420.

The vapor phase silica-based glass precursor material and dopant precursor materials (if included) are reacted in the flame 426 to produce silica-based glass soot 428 which is deposited on the bait rod 420 as the bait rod is rotated. The flame 426 of the gas-fed burner 422 is traversed back and forth over the axial length of the bait rod 420 as indicated by arrow 424 as the bait rod 420 is rotated thereby building up the doped silica-based glass soot on the bait rod 420 and forming the soot preform 402. In the embodiments described herein, the silica-based glass soot is deposited on the bait rod 420 such that the soot preform has a density of less than 1.5 $g/cm^3$. In embodiments, the density of the soot preform is in the range from greater than or equal to 0.3 $g/cm^3$ to less than or equal to 1.2 $g/cm^3$.

In step 604, once sufficient silica-based glass soot 428 is built up on the bait rod 420 to achieve a soot preform 402 having the desired outer diameter, the deposition of the silica-based glass soot 428 is discontinued and the bait rod 420 is removed from the soot preform 402 such that a cavity extends through the axial length of the soot preform. The cavity may have a diameter from about 10 mm to about 10 cm. In step 606, a glass plug (not shown) may be optionally inserted in one end of the cavity to hold a fiber bundle (described in more detail herein) in the cavity of the soot preform 402. In embodiments where a glass plug is used, the glass plug may include a central port to allow gasses to flow through the glass plug and into (or out of) the cavity in the soot preform 402.

Figure 7:
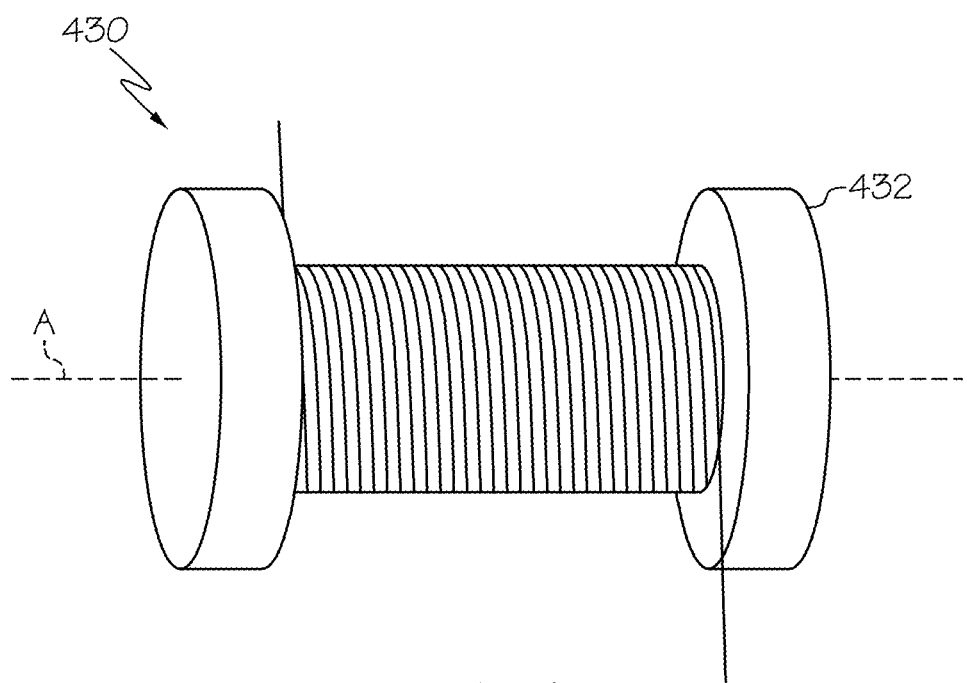
FIG. 7 schematically depicts bare optical fiber wound around a fiber reel, according to one or more embodiments shown and described herein.

Referring now to FIGS. 5 and 7, the core elements are formed from bare optical fiber. The bare optical fiber may have a diameter from about 50 μm to about 500 μm prior in its as-draw condition (i.e., prior to incorporation into the microstructured glass article). In step 608 the bare optical fiber may be drawn from glass preforms using conventional fiber drawing techniques. The glass preform from which the optical fiber is drawn has the desired relative refractive index profiles as described herein with respect to the core elements. That is, the solid glass preform is formed to produce optical fiber having the desired relative refractive index profile. In embodiments, the solid glass preform (and hence the optical fiber drawn therefrom) includes an outer glassy layer comprising $TiO_2$. This outer glassy layer mitigates breakage or damage of the optical fiber drawn from the glass preform. In embodiments, the glassy layer comprises less than or equal to 15 wt. % $TiO_2$. For example, in some embodiments, the glassy layer comprises greater than or equal to 8 wt. % and less than or equal to 10 wt. % $TiO_2$.

Still referring to FIGS. 5 and 7, the bare optical fiber 430 is wound on a fiber reel 432 in step 610. In embodiments, the fiber reel 432 may have a diameter greater than or equal to 25 cm to mitigate breakage of the bare optical fiber 430 as it is wound around the fiber reel 432.

Figure 8:
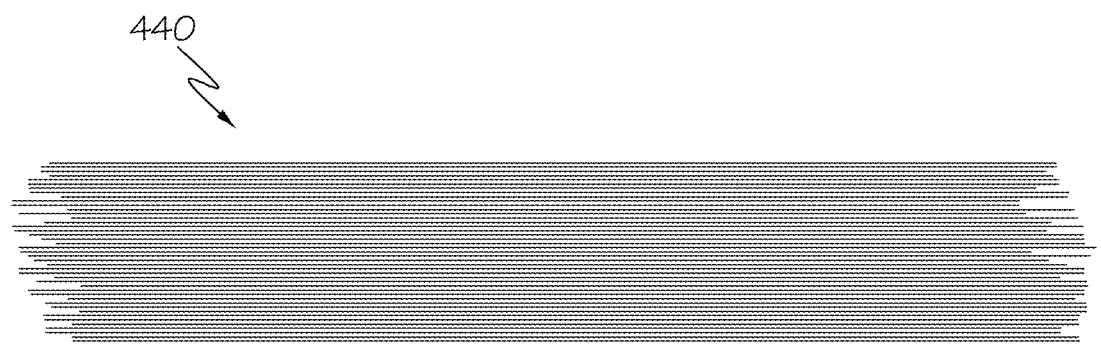
FIG. 8 schematically depicts a fiber bundle comprising bare optical fibers, according to one or more embodiments shown and described herein.

Referring now to FIGS. 5-8, in step 612, the fiber reel 432 (and the bare optical fiber 430 wound thereon) is severed along the long axis A of the fiber reel, and severed segments of bare optical fiber 430 are grouped into fiber bundles 440 in step 614, as depicted in FIG. 8. In embodiments, each fiber bundle 440 may have M bare optical fibers, where M is an integer as described herein. In other embodiments, each fiber bundle 440 may have less than M bare optical fibers and a plurality of optical fiber bundles 440 may be combined together such that M bare optical fiber are inserted into the cavity of a soot preform, as described below.

Figure 9:
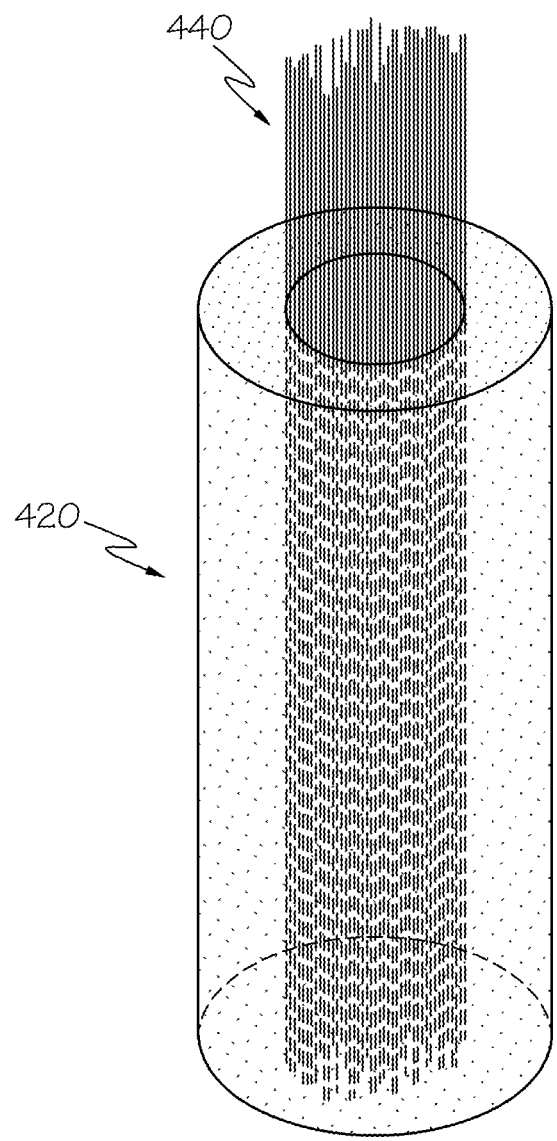
FIG. 9 schematically depicts a fiber bundle inserted in a cavity of a soot preform, according to one or more embodiments shown and described herein.
Figure 10:
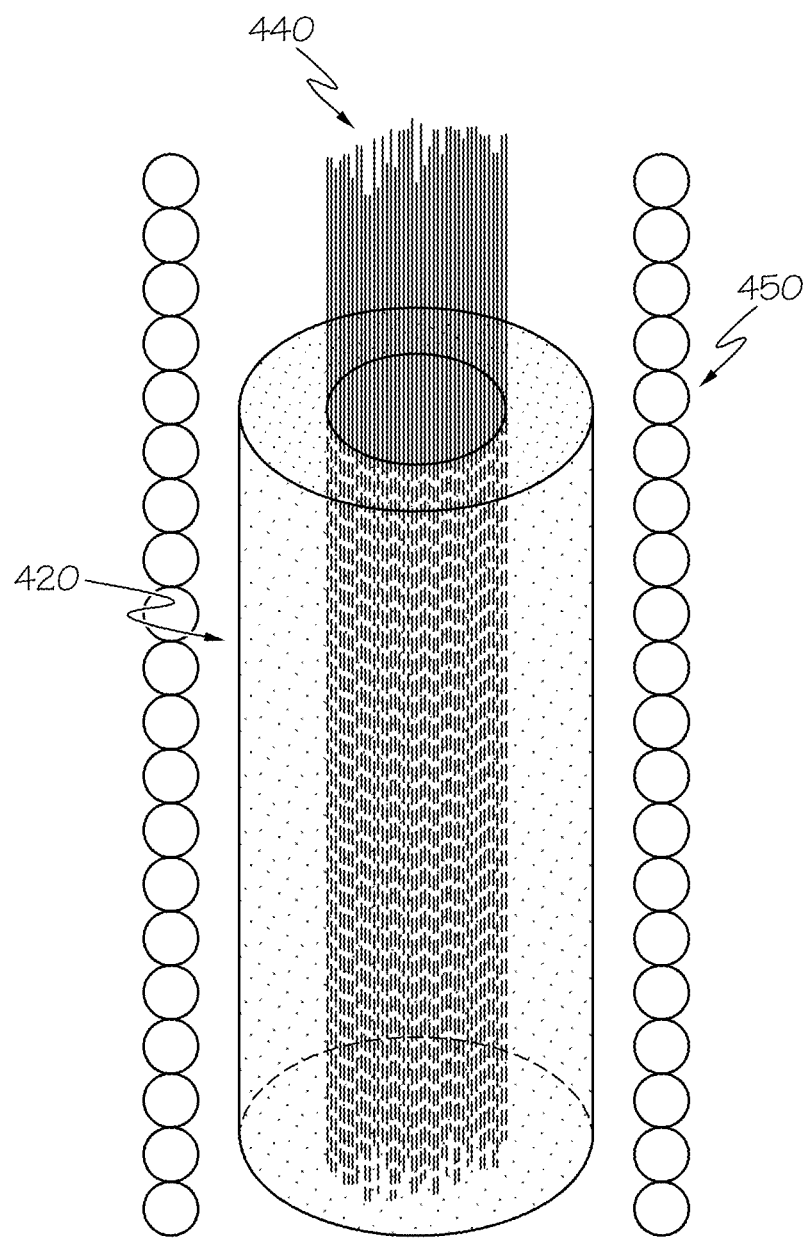
FIG. 10 schematically depicts the fiber bundle and soot preform of FIG. 8 being consolidated in a consolidation furnace, according to one or more embodiments shown and described herein.

Referring now to FIGS. 5 and 9-10, in step 616 the fiber bundle 440 is inserted in the cavity of the soot preform 402 (FIG. 9) and the glass plug (not shown) retains the fiber bundle 440 in the cavity of the soot preform 402. Thereafter, in step 618, the soot preform 402 and inserted fiber bundle 440 are placed in a consolidation furnace 450 (FIG. 10) and heated to a temperature from about 1000° C. to 1200° C. in flowing chlorine gas to dry the soot preform 402. The central port of the glass plug allows the chlorine gas to flow through the cavity of the soot preform 402 so that the soot preform 402 is uniformly dried.

Thereafter, in step 620, the soot preform 402 and the inserted fiber bundle 440 are heated to a temperature from about 1225° C. to about 1535° C. to densify (i.e., consolidate) the silica-based glass soot of the soot preform 402 into fully dense glass (i.e., glass with a density of approximately 2.2 g/cm³) and to fuse the fibers of the fiber to each other and to the densified glass of the preform. In embodiments, the soot preform 402 and the inserted fiber bundle 440 are heated to a temperature from about 1390° C. to about 1535° C. to densify the silica-based glass soot of the soot preform 402. The soot preform 402 and inserted fiber bundle 440 may be densified in an atmosphere of flowing helium. In other embodiments, such as embodiments where the cladding matrix is down-doped with fluorine, fluorine gas may be directed through the soot preform 402 during consolidation to dope the soot preform 402 with fluorine and thereby decrease the index of refraction of the cladding matrix. As the silica-based glass soot is consolidated and sintered into fully dense glass, the bare optical fibers of the fiber bundle 440 are fused to one another and to the glass of the soot preform 402 thereby forming a microstructured glass article preform having preform core elements (i.e., the bare optical fibers) embedded in a preform cladding matrix (i.e., the densified silica-based glass soot). In embodiments, a vacuum may be drawn on the microstructured glass article preform during the consolidation process to remove any residual air from the preform and thereby assist in densification.

Thereafter, in step 622, the microstructured glass article preform may be further processed by conventional optical fiber manufacturing techniques to form microstructured glass articles. For example, in embodiments, the microstructured glass article preform may be drawn directly into optical fiber utilizing conventional optical fiber drawing techniques. The optical fiber includes a plurality of core elements in a cladding matrix, as described herein with respect to FIGS. 1, 3, and 4 and, hence, is a microstructured glass article. Alternatively, the microstructured glass article preform may be drawn into glass canes using conventional redrawing techniques. The glass canes include a plurality of core elements in a cladding matrix, as described herein with respect to FIGS. 1, 3, and 4 and, hence, are microstructured glass articles. In embodiments, a vacuum may be drawn on the microstructured glass article as the article is redrawn into canes or drawn into fiber to reduce the amount of residual air in the preform and aid in further densifying the glass.

While FIGS. 5-10 schematically depict one embodiment of a method of making a microstructured glass article preform, it should be understood that other embodiments are contemplated and possible.

Figure 11:
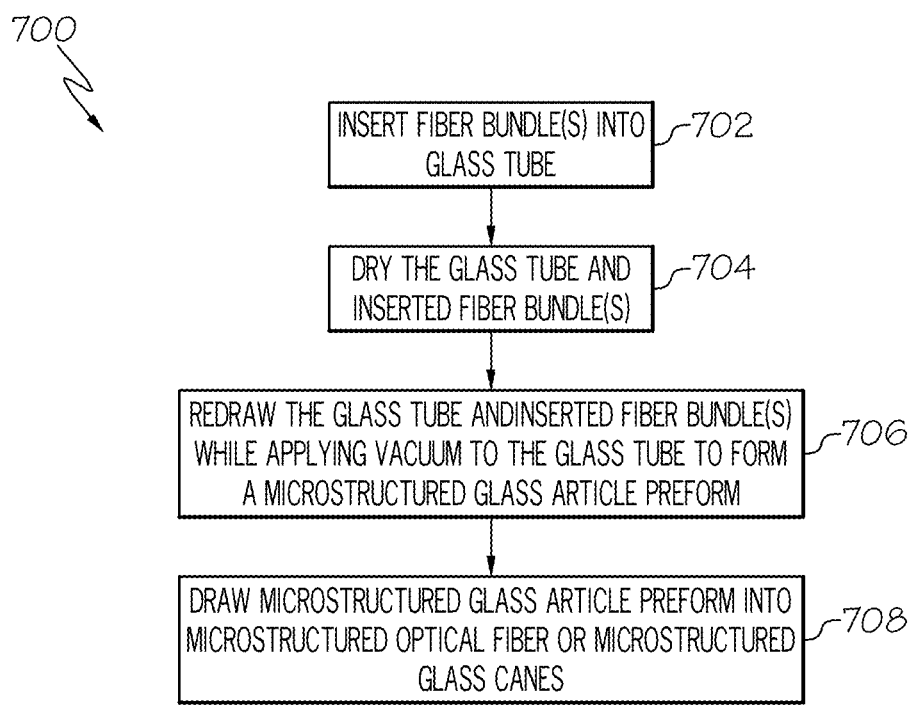
FIG. 11 is a flow chart of the steps for making a microstructured glass article according to one or more embodiments shown and described herein.
Figure 12:
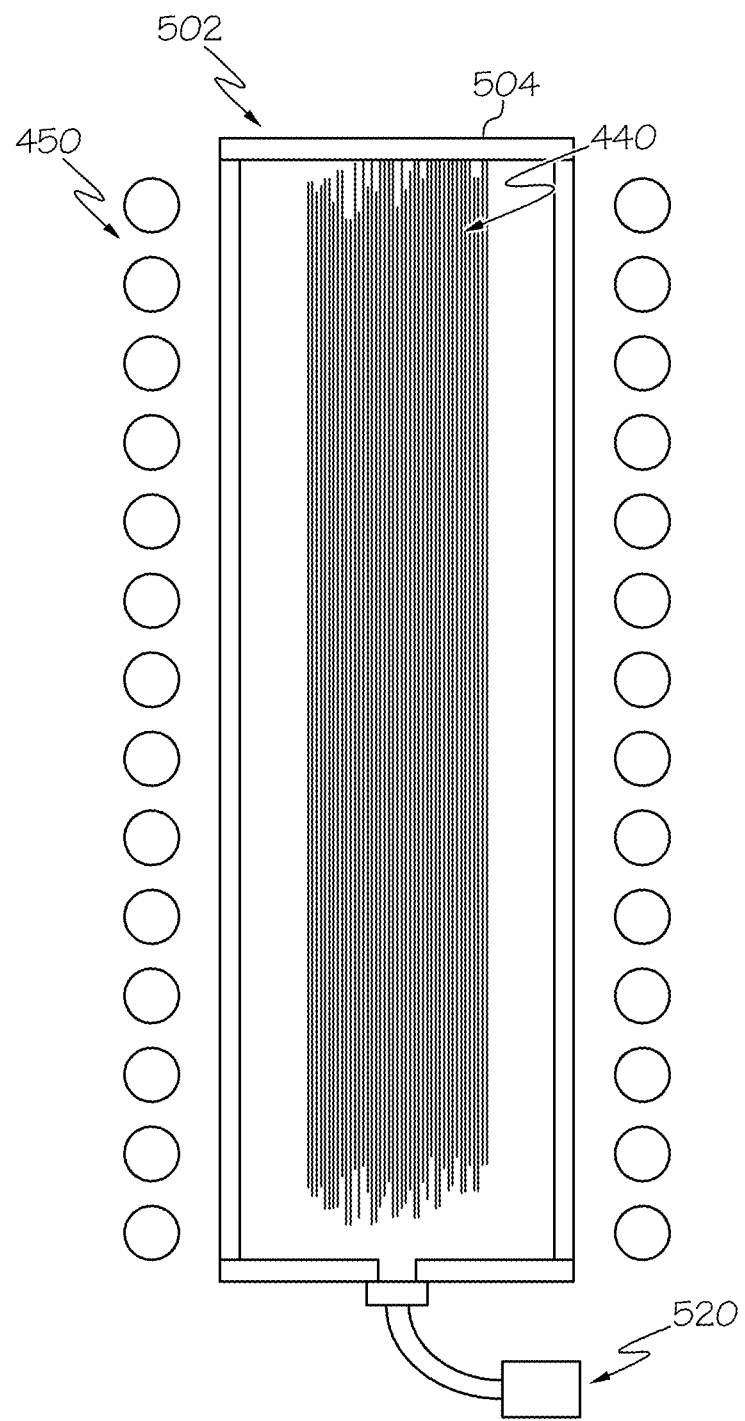
FIG. 12 schematically depicts an alternative method of forming a microstructured glass article preform.

Referring now to FIGS. 11 and 12 by way of example, a flow chart of an alternative method 700 for forming a microstructured glass article is shown in FIG. 11 and schematically depicted in FIG. 12. In this embodiment, fiber bundles are created as described herein with respect to FIGS. 5-10. However, in this embodiment, the cladding matrix of the microstructured glass article is formed from a glass tube 502 having a sealed end 504. In step 702 the fiber bundle(s) 440 are inserted into the glass tube 502. Optionally, in step 704, the glass tube 502 and inserted fiber bundle(s) 440 may be dried as described herein with respect to FIGS. 5-10. In step 706, the glass tube 502 and inserted fiber bundle 440 are passed through a redraw furnace and heated to a temperature from about 1600° C. to about 1900° C. to soften the glass and fuse the bare optical fiber of the fiber bundle 440 to one another and to the glass of the glass tube 502. Simultaneously, a vacuum is drawn on the glass tube 502 with vacuum pump 520 to collapse the glass tube 502 around the fiber bundle 440 thereby forming a microstructured glass article preform. Thereafter, in step 708, the preform may be further processed with conventional optical fiber manufacturing techniques to form optical fiber or glass canes (i.e., microstructured glass articles).

EXAMPLES

The embodiments described herein will be further clarified by the following examples.

Example 1

A soot preform was formed by depositing approximately 3,000 g of silica-glass based soot on a bait rod having a diameter of 9 mm. The deposited soot was substantially free from dopants (i.e., the soot was pure silica glass). The soot preform had a density of approximately 0.45 g/cm³ following removal of the bait rod.

Bare optical fiber was drawn from a multimode optical fiber preform. The optical fiber comprised a core surrounded by a cladding of pure silica glass. The core of the optical fiber had a relative refractive index of 1% relative to the cladding and a graded index profile with alpha value of about 2.1. The optical fiber had a diameter of 500 µm and a length of approximately 2 km. The optical fiber was segmented into 50 cm lengths and the 50 cm lengths were grouped into a fiber bundle having from about 150 to 200 fibers.

The fiber bundle was inserted into the cavity of the soot preform formed by the bait rod. A glass plug having a small channel was inserted into one end of the soot preform to retain the fiber bundle in place. The soot preform and inserted fiber bundle was dried in a consolidation furnace with flowing chlorine gas at a temperature of about 1100° C. for 30 minutes. The soot preform and inserted fiber bundle were then consolidated in a consolidation furnace at 1450° C. in a He atmosphere for 2 hours to form a microstructured glass article preform.

Figure 13:
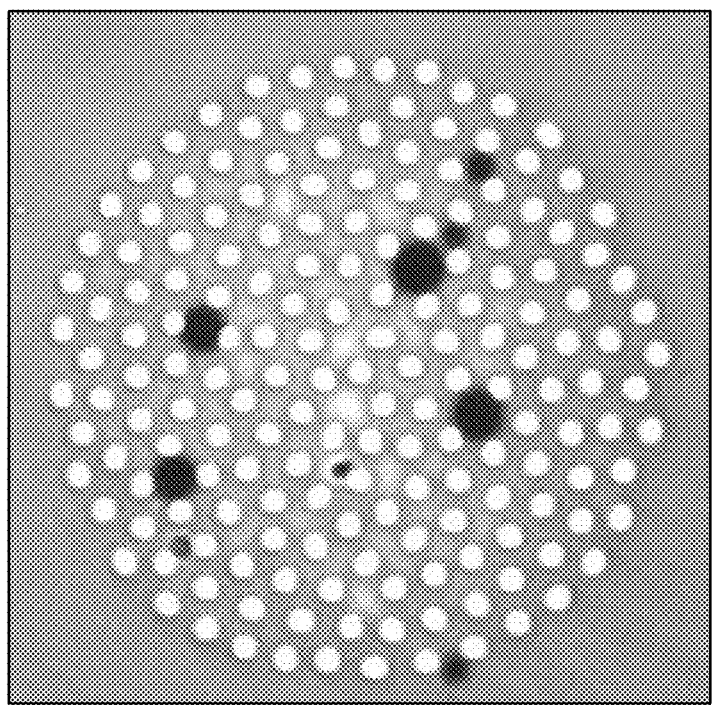
FIG. 13 is a photograph of a microstructured glass article according to one or more embodiments shown and described herein.

After consolidation a vacuum was drawn on the portion of the microstructured glass article preform corresponding to the fiber bundle as the preform was drawn to a smaller diameter to remove any residual air from the preform. The microstructured glass preform was then drawn directly into optical fiber having a diameter of about 350 µm with a plurality of core elements corresponding to the optical fibers of the fiber bundle (i.e., a microstructured glass article). An image of a cross-section of microstructured glass article is shown in FIG. 13. The core elements of the microstructured glass article had a diameter of about 2.5 µm and a relative refractive index $\Delta_C\%$ of 1% relative to the cladding matrix.

Example 2

Figure 14:
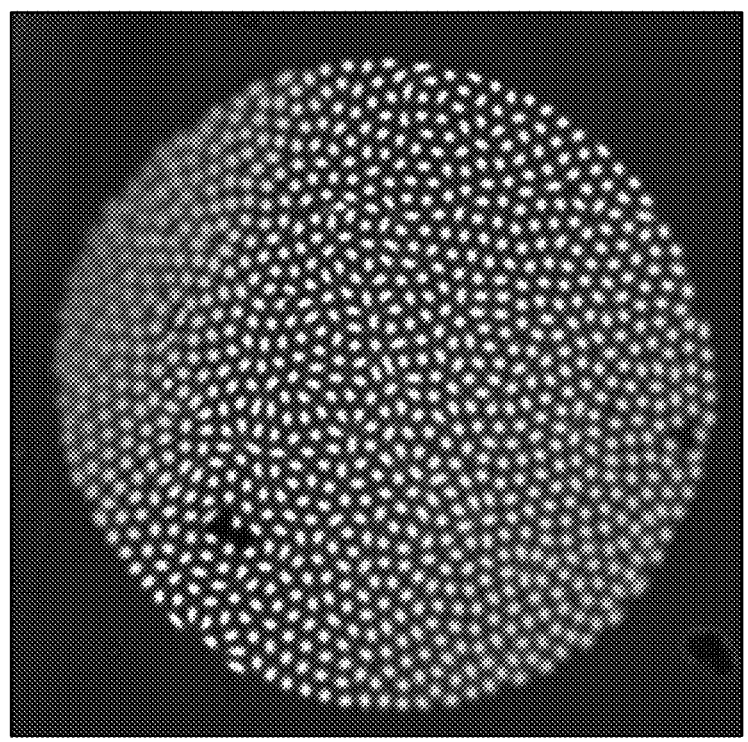
FIG. 14 is a photograph of a microstructured glass article according to one or more embodiments shown and described herein.

A microstructured glass article preform was made using the process of Example 1, with the exception that the microstructured glass had a relative refractive index $\Delta_C\%$ of 2% relative to the cladding. The microstructured glass article preform was drawn into a microstructured glass article having a diameter of 300 micrometers. An image of the cross-section of this fiber is shown in FIG. 14. The core elements of the microstructured glass article had a diameter of about 1.5 µm to 3 µm and a relative refractive index $\Delta_C\%$ of 2% relative to the cladding matrix.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A method of making a microstructured glass article, the method comprising:
 bundling M bare optical fibers in a fiber bundle, wherein M is greater than 100;
 inserting the fiber bundle in a cavity of a soot preform, the soot preform having a density of less than or equal to 1.5 g/cm³ and comprising silica-based glass soot;
 consolidating the soot preform and inserted fiber bundle to form a microstructured glass article preform; and
 drawing the microstructured glass article preform into the microstructured glass article comprising M core elements embedded in a cladding matrix.

2. The method of claim 1, wherein the soot preform and inserted fiber bundle are consolidated at a temperature from about 1225° C. to about 1535° C.

3. The method of claim 1, further comprising drying the soot preform and inserted fiber bundle at a temperature from about 1000° C. to 1200° C. in flowing chlorine gas after inserting and prior to consolidating.

4. The method of claim 1, further comprising doping the soot preform with fluorine during the consolidating.

5. The method of claim 1, wherein the bare optical fibers have diameters from about 50 µm to about 500 µm.

6. The method of claim 1, wherein the bare optical fibers comprise a glassy layer comprising less than or equal to 15 wt. % $TiO_2$.

7. The method of any of claim 1, wherein the core elements have a step index profile or a graded index profile.

8. The method of claim 1, wherein the core elements have a refractive index $n_C$, the cladding matrix has a refractive index $n_{C1}$, and $n_C > n_{C1}$.

9. The method of claim 1, wherein each core element has a low-index annulus surrounding the core element, the low-index annulus having an index of refraction $n_L$ such that $n_L < n_{C1} < n_C$.

10. The method of claim 1, wherein the core elements have a refractive index $n_C$, the cladding matrix has a refractive index $n_{C1}$, and $n_C < n_{C1}$.

11. The method of claim 2, wherein the soot preform and inserted fiber bundle are consolidated at from about 1390° C. to about 1535° C.

12. The method of claim 8, wherein a relative refractive index percent (Δ%) of the core elements relative to the cladding matrix is greater than about 0.3%.

13. The method of claim 9, wherein the low-index annulus comprises from about 0.36 wt % to about 3.0 wt % fluorine of the low-index annulus.

14. The method of claim 1, wherein the core elements comprise silica-based glass up-doped with germania.

15. The method of claim 14, wherein the silica-based glass up-doped with germania comprises from about 5 wt % to about 16 wt % $GeO_2$ of the core elements.

16. The method of claim 1, wherein the core elements have radii less than or equal to 5 µm.

17. The method of claim 16, wherein the radii are from 100 nm to 500 nm.

18. The method of claim 1, wherein the soot preform has a density from 0.3 g/cm³ to 1.2 g/cm³.

19. The method of claim 1, wherein the core elements are hollow.

* * * * *

UNITED STATES PATENT AND TRADEMARK OFFICE
CERTIFICATE OF CORRECTION

PATENT NO. : 11,643,354 B2
APPLICATION NO. : 17/849005
DATED : May 9, 2023
INVENTOR(S) : Ming-Jun Li et al.

It is certified that error appears in the above-identified patent and that said Letters Patent is hereby corrected as shown below:

On the Title Page

In item (56), in Column 2, in "Related U.S. Patent Documents", Line 1, delete "Koshimura et al." and insert -- YOSHIMURA et al. --.

Signed and Sealed this
Twelfth Day of December, 2023

Katherine Kelly Vidal
*Director of the United States Patent and Trademark Office*